US012031253B2

(12) United States Patent
Kamihira et al.

(10) Patent No.: US 12,031,253 B2
(45) Date of Patent: Jul. 9, 2024

(54) MONITORING SYSTEM, SEWING MACHINE, AND MONITORING METHOD

(71) Applicant: BROTHER KOGYO KABUSHIKI KAISHA, Nagoya (JP)

(72) Inventors: Yuta Kamihira, Ama (JP); Tomotaka Katano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 360 days.

(21) Appl. No.: 17/572,457

(22) Filed: Jan. 10, 2022

(65) Prior Publication Data

US 2022/0127770 A1 Apr. 28, 2022

Related U.S. Application Data

(63) Continuation of application No. PCT/JP2020/012284, filed on Mar. 19, 2020.

(30) Foreign Application Priority Data

Jul. 26, 2019 (JP) ................................ 2019-138186

(51) Int. Cl.
*D05B 19/10* (2006.01)
*D05B 19/00* (2006.01)
(Continued)

(52) U.S. Cl.
CPC ......... *D05B 19/105* (2013.01); *D05B 19/006* (2013.01); *D05B 19/02* (2013.01);
(Continued)

(58) Field of Classification Search
CPC .... D05B 19/105; D05B 19/006; D05B 19/02; D05B 19/08; D05B 19/12; D05B 19/10;
(Continued)

(56) References Cited

U.S. PATENT DOCUMENTS 5,954,005 A * 9/1999 Sekine ................... D05B 19/12
112/155
5,970,894 A * 10/1999 Mase ..................... D05B 19/02
112/102.5
(Continued)

FOREIGN PATENT DOCUMENTS

JP 2010-057720 A 3/2010
JP 2010-136822 A 6/2010
(Continued)

OTHER PUBLICATIONS

Jun. 23, 2020 Search Report issued in International Patent Application No. PCT/JP2020/012284.
Oct. 3, 2023 Office Action issued in Japanese Patent Application No. 2019-138186.

*Primary Examiner* — Ismael Izaguirre
(74) *Attorney, Agent, or Firm* — Oliff PLC

(57) ABSTRACT

A sewing machine detects a sewing status after a change, when the sewing status changes. When the sewing machine receives a status request requesting the sewing status, from an information terminal via a LAN, the sewing machine transmits, to the information terminal, sewing status information that accords with the detected sewing status. When the detected sewing status satisfies a predetermined condition, the sewing machine transmits a notification request, which includes identification information identifying the information terminal, to a server, in order to cause the server to transmit, to the information terminal, a notification command instructing a push notification in the information terminal.

16 Claims, 12 Drawing Sheets

(51) Int. Cl.
*D05B 19/02* (2006.01)
*D05B 19/08* (2006.01)
*D05B 19/12* (2006.01)
*D05C 7/00* (2006.01)
*D05C 13/02* (2006.01)
*G05B 19/406* (2006.01)
*G05B 19/4155* (2006.01)
*H04L 67/12* (2022.01)

(52) U.S. Cl.
CPC .............. *D05B 19/08* (2013.01); *D05B 19/12* (2013.01); *D05C 7/00* (2013.01); *D05C 13/02* (2013.01); *G05B 19/406* (2013.01); *G05B 19/4155* (2013.01); *H04L 67/12* (2013.01); *D05D 2205/18* (2013.01); *G05B 2219/2626* (2013.01)

(58) Field of Classification Search
CPC ........ D05B 19/00; D05B 19/04; D05B 19/06; D05B 19/085; D05C 7/00; D05C 13/02; D05D 2205/18; D05D 2205/00; G05B 19/406; G05B 19/4155; G05B 2219/2626; H04L 67/12
See application file for complete search history.

(56) References Cited

U.S. PATENT DOCUMENTS

| | | | |
|---|---|---|---|
| 9,769,333 B2* | 9/2017 | Miyazawa | H04N 1/32117 |
| 2007/0005965 A1* | 1/2007 | Nalliah | H04L 63/0823 |
| | | | 713/168 |
| 2010/0139538 A1 | 6/2010 | Tashiro | |
| 2014/0230707 A1* | 8/2014 | Suzuki | D05B 19/12 |
| | | | 112/102.5 |
| 2015/0040810 A1 | 2/2015 | Kongo et al. | |
| 2017/0063567 A1 | 3/2017 | Tanaka et al. | |
| 2019/0003095 A1* | 1/2019 | Kobayashi | D05B 19/085 |
| 2019/0034140 A1 | 1/2019 | Yamada | |

FOREIGN PATENT DOCUMENTS

| | | |
|---|---|---|
| JP | 2015-033468 A | 2/2015 |
| JP | 2016-058789 A | 4/2016 |
| JP | 2016-214511 A | 12/2016 |
| JP | 2017-175531 A | 9/2017 |
| JP | 2017-225341 A | 12/2017 |
| JP | 2018-147358 A | 9/2018 |
| JP | 2019-028755 A | 2/2019 |

* cited by examiner

MONITORING SYSTEM, SEWING MACHINE, AND MONITORING METHOD

CROSS REFERENCE TO RELATED APPLICATIONS

This application is a Continuing application of International Application No. PCT/JP2020/012284, filed Mar. 19, 2020, which claims priority from Japanese Patent Application No. 2019-138186, filed on Jul. 26, 2019. This disclosure of the foregoing application is hereby incorporated by reference in its entirety.

BACKGROUND

The present disclosure relates to a monitoring system, a sewing machine, and a monitoring method that notify a user of a sewing status of the sewing machine.

A embroidery status verification system including a sewing machine and an embroidery status verification device is known. The sewing machine and the embroidery status verification device are connected via a wireless network. When an embroidery status of the sewing machine is verified in the embroidery status verification device, an installed embroidery status verification application is activated, and monitoring processing is started. In the monitoring processing, in order to request status data relating to a pattern currently being embroidered by the sewing machine, a status request is repeatedly transmitted at a predetermined interval to the sewing machine from the embroidery status verification device. When the sewing machine receives the status request, the sewing machine transmits, to the embroidery status verification device, the status data representing the pattern currently being sewn. The embroidery status verification device receives the status data, and draws image data on a display portion.

SUMMARY

In the above-described system, when a session on the wireless network between the sewing machine and the embroidery status verification device is disconnected, the monitoring processing in the embroidery status verification device cannot be performed. Further, when the embroidery status verification application activated on the embroidery status verification device is changed from a state of being executed in the foreground to a state of being executed in the background, the embroidery status verification device cannot receive the status data from the sewing machine using the embroidery status verification application, and thus, cannot perform the monitoring processing.

The object of the present disclosure is to provide a monitoring system, a sewing machine, and a monitoring method capable of notifying a user of a status of the sewing machine, in an information terminal, even when a session between the sewing machine and the information terminal is disconnected, when data transmitted from the sewing machine via a local area network (LAN) cannot be received by the information terminal, and the like.

Various embodiments herein provide a monitoring system includes a sewing machine that performs sewing, an information terminal including a display portion, and a server. The sewing machine and the information terminal communicate via a LAN. The sewing machine and the server communicate via a public network. The information terminal and the server communicate via the public network. The sewing machine includes a first processor, and a first memory configured to store computer-readable instructions that, when executed by the first processor, instruct the first processor to perform processes including acquisition processing, first sewing machine reception processing, first sewing machine transmission processing, and second sewing machine transmission processing. The information terminal includes a second processor, and a second memory configured to store computer-readable instructions that, when executed by the second processor, instruct the second processor to perform a process including first terminal transmission processing, first terminal reception processing, first terminal reception processing, first terminal display processing, second terminal reception processing, and second terminal display processing. The server includes a third processor, and a third memory configured to store computer-readable instructions that, when executed by the third processor, instruct the third processor to perform processes including server reception processing server transmission processing. The acquisition processing acquires, when a sewing status of the sewing machine changes, the sewing status after the change. The first terminal transmission processing uses an App transmission function to transmit, to the sewing machine via the LAN, a status request requesting the sewing status. The App transmission function is a transmission function of an application executed on an operating system. The first sewing machine reception processing receives, via the LAN, the status request transmitted from the information terminal. The first sewing machine transmission processing transmits, to the information terminal via the LAN, first status information that accords with the sewing status acquired by the acquisition processing, when the status request is received by the first sewing machine reception processing. The first terminal reception processing uses an App reception function to receive, via the LAN, the first status information transmitted from the sewing machine. The App reception function is a reception function of the application. The first terminal display processing uses an App display function to display, on the display portion, the sewing status represented by the received first status information, when the first status information is received by the first terminal reception processing. The App display function is a display function of the application. The second sewing machine transmission processing transmits, to the server via the public network, a notification request including second status information that accords with the sewing status, and identification information identifying the information terminal, when the sewing status acquired by the acquisition processing satisfies a predetermined condition. The server reception processing receives, via the public network, the notification request transmitted from the sewing machine. The server transmission processing transmits, via the public network, to the information terminal identified by the identification information included in the received notification request, a notification command instructing a push notification for notifying the sewing status represented by the second status information included in the notification request received by the server reception processing. The second terminal reception processing uses an OS reception function to receive, via the public network, the notification command transmitted from the server. The OS reception function is a reception function of the operating system. The second terminal display processing uses an OS display function to display, on the display portion, the push notification for notifying the sewing status, when the notification command is received by the second terminal reception processing. The OS display function is a display function of the operating system.

Various embodiments also provide a sewing machine that performs sewing. The sewing machine communicates with an information terminal including a display portion via a LAN, and communicates with a server via a public network. The sewing machine includes a processor; and a memory configured to store computer-readable instructions that, when executed by the processor, instruct the processor to perform processes including acquisition processing, first sewing machine reception processing, first sewing machine transmission processing, and second sewing machine transmission processing. The acquisition processing acquires, when a sewing status of the sewing machine changes, the sewing status after the change. The first sewing machine reception processing receives, when a status request requesting the sewing status is transmitted from the information terminal, the status request via the LAN. The first sewing machine transmission processing transmits, to the information terminal via the LAN, first status information that accords with the sewing status acquired by the acquisition processing, when the status request is received by the first sewing machine reception processing. The second sewing machine transmission processing transmits, to the server via the public network, a notification request including second status information that accords with the sewing status, and identification information identifying the information terminal, when the sewing status acquired by the acquisition processing satisfies a predetermined condition. The notification request causes a notification command to be transmitted from the server to the information terminal via the public network. The notification command instructs a push notification in the information terminal.

Various embodiments also provide a monitoring method executed in a monitoring system including a sewing machine that performs sewing, an information terminal that includes a display portion, and a server. The sewing machine communicates with the information terminal via a LAN. The sewing machine communicates with the server via a public network. The information terminal communicating with the server via the public network. The monitoring method includes an acquisition step, a first terminal transmission step, a first sewing machine reception step, a first sewing machine transmission step, a first terminal reception step, a first terminal display step, a second sewing machine transmission step, a server reception step, a server transmission step, a second terminal reception step, and a second terminal display step. The acquisition step of the sewing machine acquires, when a sewing status of the sewing machine changes, the sewing status after the change. The first terminal transmission step of the information terminal uses an App transmission function to transmit, to the sewing machine via the LAN, a status request requesting the sewing status. The App transmission function is a transmission function of an application executed on an operating system of the information terminal. The first sewing machine reception step of the sewing machine receives, via the LAN, the status request transmitted from the information terminal. The first sewing machine transmission step of the sewing machine transmits, to the information terminal via the LAN, first status information that accords with the sewing status acquired by the acquisition step, when the status request is received by the first sewing machine reception step. The first terminal reception step of the information terminal uses an App reception function to receive, via the LAN, the first status information transmitted from the sewing machine. The App reception function is a reception function of the application. The first terminal display step of the information terminal uses an App display function to display, on the display portion, the sewing status represented by the received first status information, when the first status information is received by the first terminal reception step. The App display function is a display function of the application. The second sewing machine transmission step of the sewing machine transmits, to the server via the public network, a notification request including second status information that accords with the sewing status, and identification information identifying the information terminal, when the sewing status acquired by the acquisition step satisfies a predetermined condition. The server reception step of the server receives, via the public network, the notification request transmitted from the sewing machine. The server transmission step of the server transmits, via the public network, to the information terminal identified by the identification information included in the received notification request, a notification command instructing a push notification for notifying the sewing status represented by the second status information included in the notification request received by the server reception step. The second terminal reception step of the information terminal uses an OS reception function to receive, via the public network, the notification command transmitted from the server. The OS reception function is a reception function of the operating system. The second terminal display step of the information terminal uses an OS display function to display, on the display portion, the push notification for notifying the sewing status, when the notification command is received by the second terminal reception step. The OS display function is a display function of the operating system.

BRIEF DESCRIPTION OF THE DRAWINGS

Embodiments of the disclosure will be described below in detail with reference to the accompanying drawings in which.

DETAILED DESCRIPTION OF EMBODIMENTS

Embodiments embodying the present disclosure will be explained with reference to the drawings. The referenced drawings are used to explain technological features that can be adopted by the present disclosure, and configurations and the like of devices described therein are not intended to be limited thereto, and the referenced drawings are merely explanatory examples.

Overview of Monitoring System 1

Figure 1:
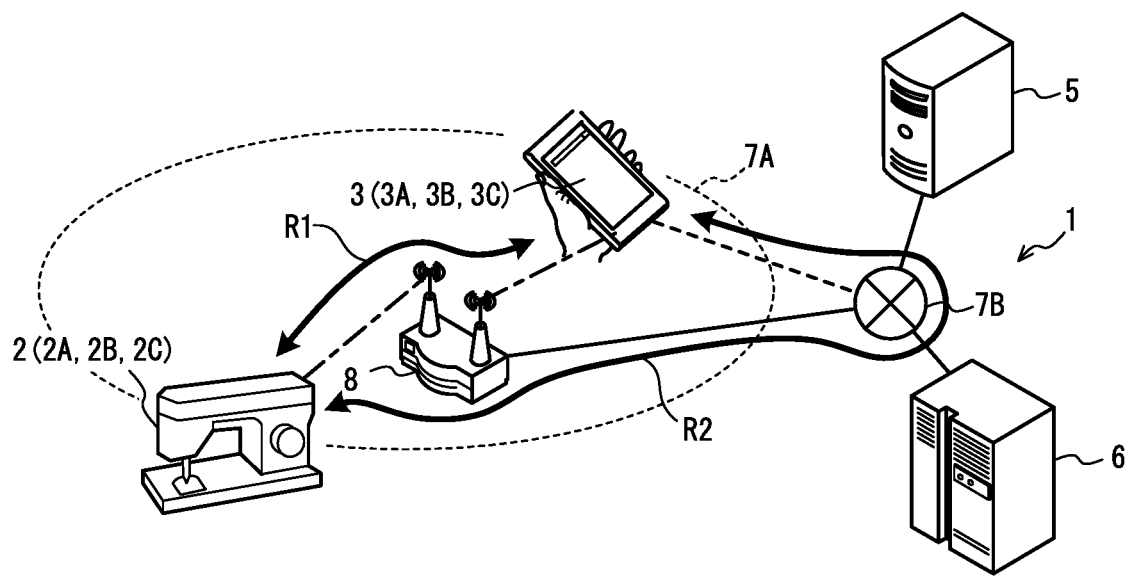
FIG. 1 is a system configuration diagram of a monitoring system.

As shown in FIG. 1, a monitoring system 1 includes sewing machines 2A, 2B, and 2C (hereinafter, where these are not distinguished from each other, they are collectively referred to as a sewing machine 2), information terminals 3A, 3B, and 3C (hereinafter, where these are not distinguished from each other, they are collectively referred to as an information terminal 3), and servers 5 and 6. The monitoring system 1 is a system for notifying a user, via the information terminal 3, of a sewing status when an embroidery pattern is sewn by the sewing machine 2. Specific examples of the notified sewing status include a progress status of the sewing, a number of stitches for which sewing is complete, a remaining time until the sewing is complete, a ratio of a portion, of the embroidery pattern as a whole, for which the sewing is complete, and a replacement standby state, a snapped state, and a sewing complete state, and the like, to be described later.

The sewing machine 2 includes a sewing function that sews the embroidery pattern. The information terminal 3 is a known smart phone, and notifies the sewing status of the embroidery pattern by the sewing machine 2 to the user by displaying the sewing status on an LCD 308. When a notification application installed in an operating system (OS) of the information terminal 3 is activated and a state is obtained in which an operation by the user is possible (an active state), the notification of the sewing status is performed by the sewing status being displayed on the LCD 308 by the application that is being executed. Hereinafter, the application being executed in this type of state is referred to as "being executed in the foreground." Normally, the application that is being executed in the foreground is displayed foremost on the LCD 308. On the other hand, when the application is activated but a state is obtained in which the operation by the user is not possible (an inactive state), using a push notification function installed in the OS, the sewing status is notified by displaying a message indicating the sewing status on the LCD 308. Hereinafter, the application being executed in this type of state is referred to as "being executed in the background." The server 6 is a push notification distribution server that distributes a command to execute the push notification in the information terminal 3 (hereinafter referred to as a notification command). The server 5 is a management server that receives a request from the sewing machine 2 and asks the server 6 to distribute the notification command. The push notification is a function by which, when a given information update relating to the application installed in the OS of the information terminal 3 has been generated, or when the information terminal 3 has received information relating to the application from the server 6, the OS displays that information on the LCD 308.

The OS includes a sleep function. The sleep function is a power saving function, and, when an operation is not performed on the information terminal 3 for a predetermined period of time, the OS shifts to a sleep mode. When the OS is in the sleep mode, the display of the LCD 308 is switched off, and the functions of the application are paused.

The sewing machine 2 and the information terminal 3 are connected to a LAN 7A via an access point 8. In this way, the sewing machine 2 and the information terminal 3 can communicate with each other via the LAN 7A. Further, the information terminal 3, the servers 5 and 6, and the access point 8 are connected to a public network 7B. The sewing machine 2 is connected to the public network 7B via the access point 8. In this way, the sewing machine 2, the information terminal 3, and the servers 5 and 6 can communicate with each other via the public network 7B. The communication performed between the sewing machine 2 and the information terminal 3 in order to notify the user of the sewing status of the sewing machine 2 is sometimes performed via the LAN 7A (a path R1), and is sometimes performed via the LAN 7A and the public network 7B by passing through the servers 5 and 6 (a path R2).

Electrical Configuration

Figure 2:
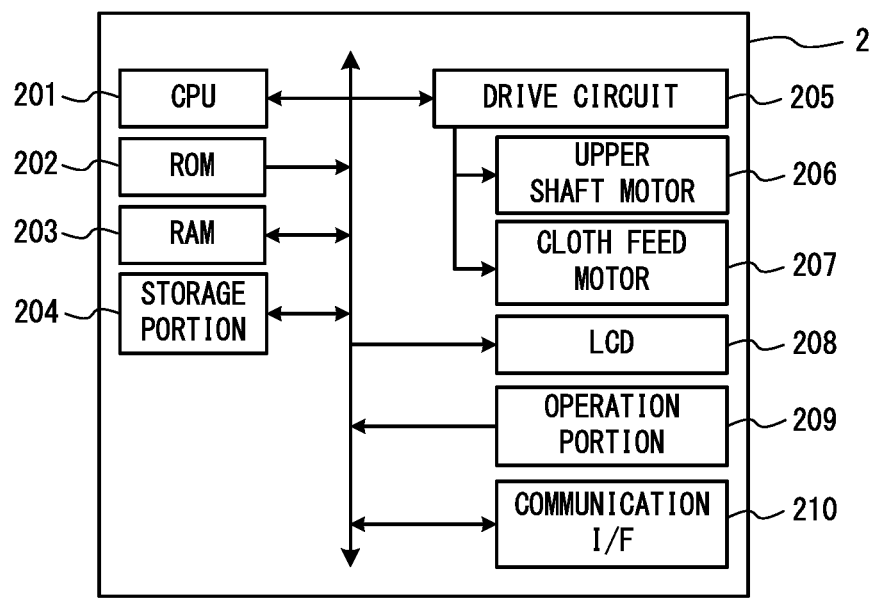
FIG. 2 is a block diagram of a sewing machine.

As shown in FIG. 2, the sewing machine 2 is provided with a CPU 201 that controls the sewing machine 2. The CPU 201 is electrically connected to a ROM 202, a RAM 203, a storage portion 204, a drive circuit 205, a liquid crystal display (LCD) 208, an operation portion 209, and a communication I/F 210, via an interface circuit that is not shown in the drawings. The ROM 202 stores a boot program and the like. The RAM 203 stores a timer, a counter, flag data, and temporary data. The storage portion 204 is configured by a storage medium, such as a flash memory. The storage portion 204 stores programs of processing executed by the CPU 201. Further, the storage portion 204 stores a table 20 to be described later (refer to FIG. 7 and the like).

The drive circuit 205 drives an upper shaft motor 206 and a cloth feed motor 207, in accordance with signals output by the CPU 201. The upper shaft motor 206 causes a sewing needle connected to a needle bar (not shown in the drawings) to reciprocate in the up-down direction. The cloth feed motor 207 causes a cloth feed mechanism (not shown in the drawings) to move in the horizontal direction. The sewing machine 2 can perform the sewing of the embroidery pattern on a cloth by simultaneously driving the upper shaft motor 206 and the cloth feed motor 207. The LCD 208 can display various types of information relating to the sewing. The operation portion 209 includes a pedal, an operation key, a touch panel, and the like (not shown in the drawings). The communication I/F 210 is a communication module for connecting to the LAN 7A and the public network 7B via the access point 8.

Figure 3:
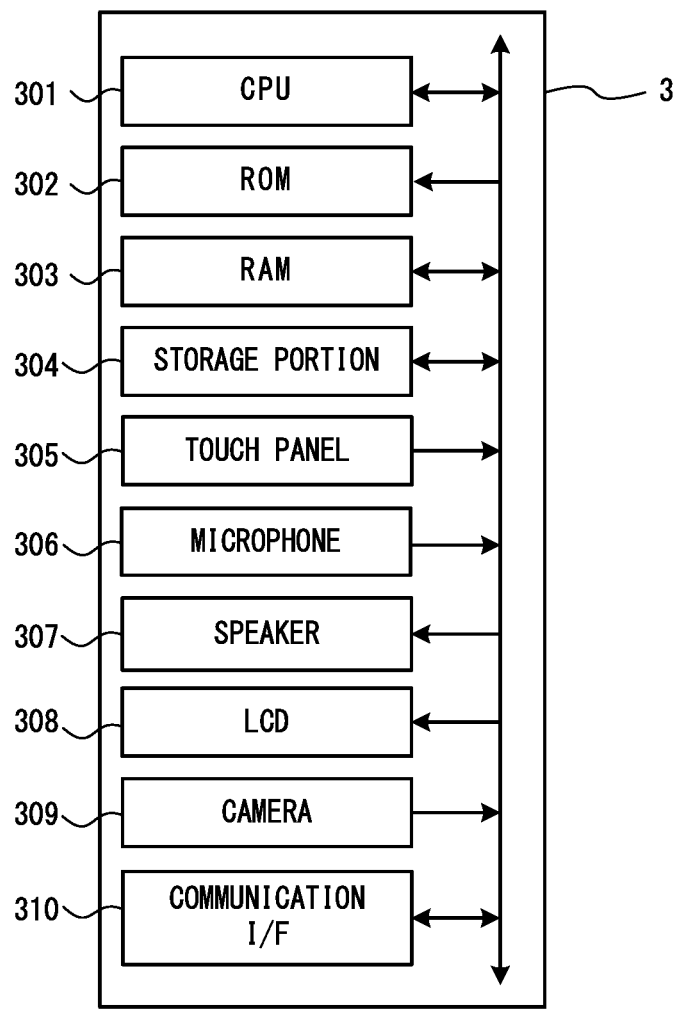
FIG. 3 is a block diagram of an information terminal.

As shown in FIG. 3, the information terminal 3 is provided with a CPU 301 that controls the information terminal 3. The CPU 301 is electrically connected to a ROM 302, a RAM 303, a storage portion 304, a touch panel 305, a microphone 306, a speaker 307, the LCD 308, a camera 309, and a communication I/F 310, via an interface circuit that is not shown in the drawings. The ROM 302 stores a boot program, and the like. The RAM 303 stores a timer, a counter, flag data, and temporary data. The storage portion 304 is configured by a storage medium, such as a flash memory. The storage portion 304 stores programs of processing executed by the CPU 301. Further, the storage portion 304 stores various programs, such as the OS, and the application operated on the OS.

The touch panel 305 detects a position at which a touch operation is performed. The microphone 306 converts ambient audio to audio data and outputs the audio data. The speaker 307 outputs audio on the basis of the input audio data. The LCD 308 displays an image on the basis of image data. The camera 309 generates and outputs a captured image obtained by capturing an imaging range. The communication I/F 310 includes a communication module for connecting to the LAN 7A and the public network 7B via the access point 8, and a communication module for directly connecting to the public network 7B.

Figure 4:
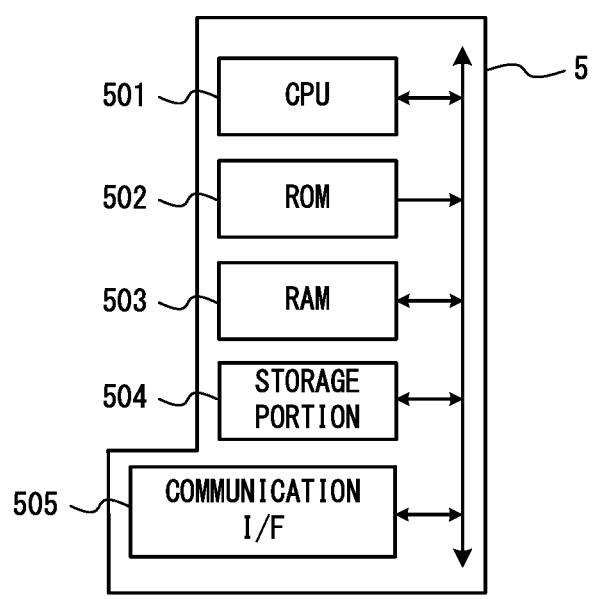
FIG. 4 is a block diagram of a server.

As shown in FIG. 4, the server 5 is provided with a CPU 501 that controls the server 5. The CPU 501 is electrically connected to a ROM 502, a RAM 503, a storage portion 504, and a communication I/F 505, via an interface circuit that is not shown in the drawings. The ROM 502 stores a boot program and the like. The RAM 503 stores a timer, a counter, flag data, and temporary data. The storage portion 504 is configured by a storage medium, such as a flash memory. The storage portion 504 stores programs of processing executed by the CPU 501. The communication I/F 505 is a communication module for connecting to the public network 7B.

Figure 5:
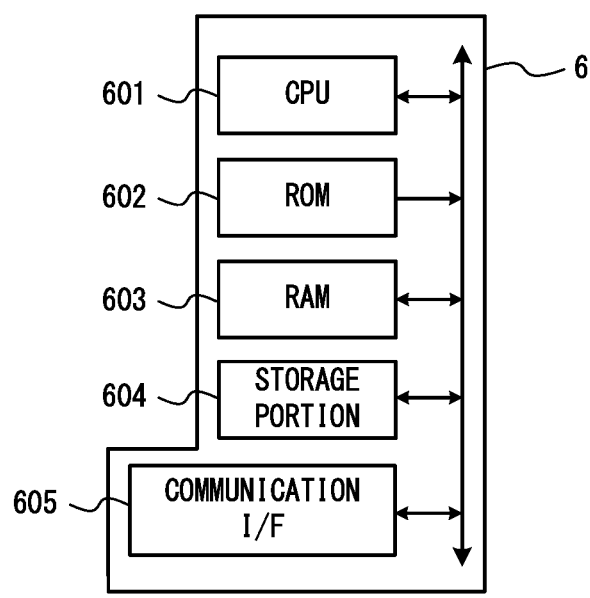
FIG. 5 is a block diagram of a server.

As shown in FIG. 5, the server 6 is provided with a CPU 601 that controls the server 6. The CPU 601 is electrically connected to a ROM 602, a RAM 603, a storage portion 604, and a communication I/F 605, via an interface circuit that is not shown in the drawings. The ROM 602 stores a boot program and the like. The RAM 603 stores a timer, a counter, flag data, and temporary data. The storage portion 604 is configured by a storage medium, such as a flash memory. The storage portion 604 stores programs of processing executed by the CPU 601. The communication I/F 605 is a communication module for connecting to the public network 7B.

Below, in order to simplify the explanation, when the CPU 201 of the sewing machine 2 executes various processing, this is denoted by "the sewing machine 2 performs . . . ". When the CPU 301 of the information terminal 3 executes various processing, this is denoted by "the information terminal 3 performs . . . ". When the CPU 501 of the server 5 executes various processing, this is denoted by "the server 5 performs . . . ". When the CPU 601 of the server 6 executes various processing, this is denoted by "the server 6 performs . . . ".

Registration/Setting Processing

A communication sequence when registration/setting processing is performed in the monitoring system 1 will be explained with reference to FIG. 6 and FIG. 7. In registration processing, in order to enable the push notification by the information terminal 3, identification information identifying the information terminal 3 is generated in the server 6, and is registered in the server 5. Further, in setting processing, a category of the sewing status of the sewing machine 2 that is the target of the push notification in the information terminal 3 is set in the sewing machine 2.

Figure 6:
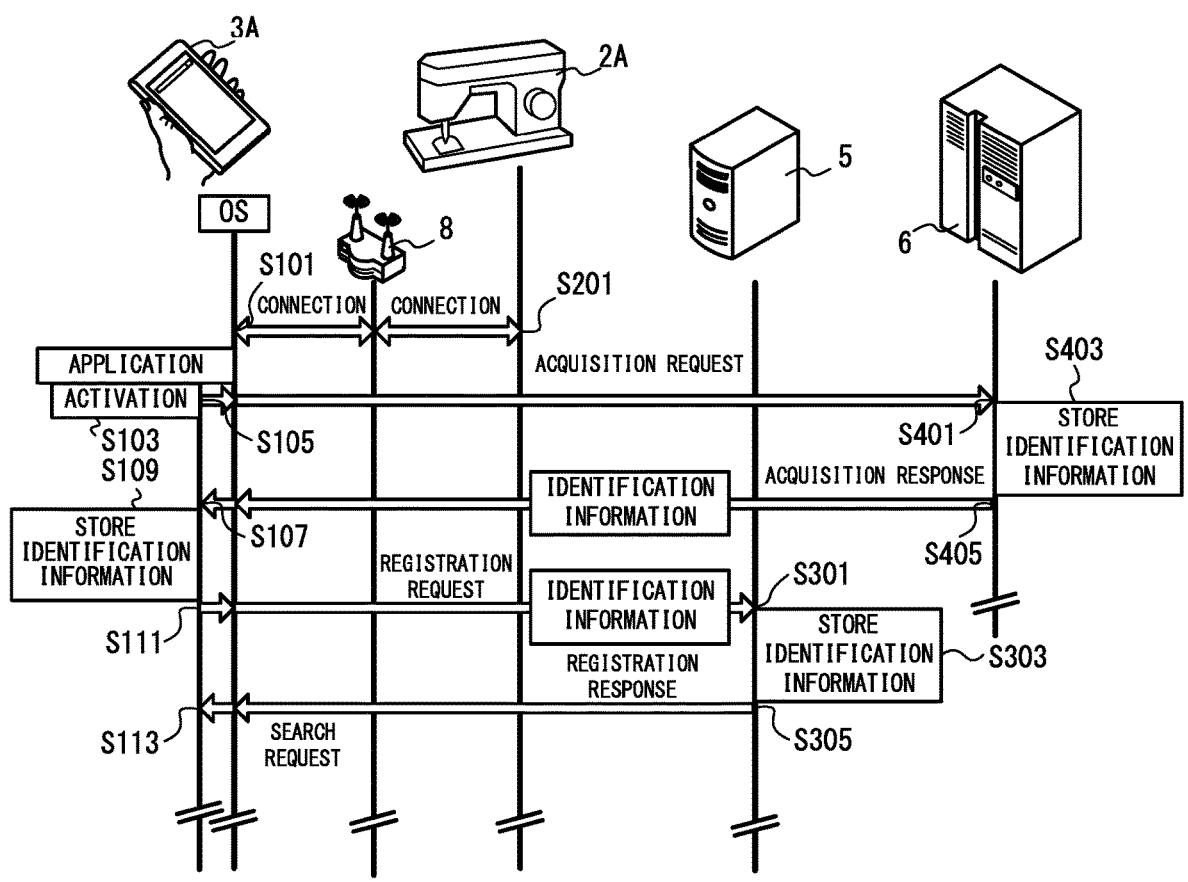
FIG. 6 is a diagram showing a communication sequence of registration/setting processing.

As shown in FIG. 6, first, the information terminal 3A connects to the LAN 7A via the access point 8, using a connection function of the OS (hereinafter referred to as an OS connection function) (step S101). Further, the information terminal 3A is originally in a state of being directly connectable to the public network 7B, but, by the processing at step S101, the information terminal 3A is able to be connected to the public network 7B via the LAN 7A (the access point 8). Similarly, the sewing machine 2A connects to the LAN 7A via the access point 8 (step S201). In this way, the sewing machine 2A can be connected to the public network 7B via the LAN 7A (the access point 8).

The user of the information terminal 3A performs a touch operation, on the touch panel 305 (refer to FIG. 3) for activating the application installed in the OS. The information terminal 3A activates the application (step S103). The information terminal 3A transmits, to the server 6 via the public network 7B, a command (referred to as an acquisition request) requesting the identification information identifying the information terminal 3A, using a transmission function of the application (step S105). A specific example of the identification information is a token. Note that, in actuality, the transmission function and a reception function of the application transmit and receive commands by further utilizing a transmission function and a reception function of the OS. Hereinafter, when the commands and the like are transmitted and received using the transmission function and the reception function of the application, an explanation is omitted with respect to the utilization of the OS transmission and reception functions. The transmission function of the application is referred to as an App transmission function, and the reception function of the application is referred to as an App reception function.

The server 6 receives, via the public network 7B, the acquisition request transmitted from the information terminal 3A (step S401). The server 6 generates the identification information that identifies the information terminal 3A that has transmitted the acquisition request, and stores the identification information in the storage portion 604 (refer to FIG. 5) (step S403). Via the public network 7B, the server 6 transmits a command (hereinafter referred to as an acquisition response) that includes the generated identification information, to the information terminal 3A that transmitted the acquisition request (step S405). Using the App reception function, the information terminal 3A receives, via the public network 7B, the acquisition response transmitted from the server 6 (step S107). The information terminal 3A stores the identification information included in the received acquisition response in the storage portion 304 (refer to FIG. 3) (step S109). In FIG. 6 to FIG. 12, the pieces of identification information corresponding to the information terminals 3A, 3B, and 3C are respectively indicated by the reference signs thereof (3A, 3B, and 3C).

Using the App transmission function, the information terminal 3A transmits a command (hereinafter referred to as a registration request) to the server 5, via the public network 7B, for causing the identification information received from the server 6 to be registered in the server 5 (step S111). The identification information is included in the registration request. The server 5 receives, via the public network 7B, the registration request transmitted from the information terminal 3A (step S301). The server 5 stores the identification information included in the received registration request in the storage portion 504 (refer to FIG. 4) (step S303). The server 5 transmits, to the information terminal 3A via the public network 7B, a command (hereinafter referred to as a registration response) notifying that the identification information has been registered (step S305). Using the App reception function, the information terminal 3A receives, via the public network 7B, the registration response transmitted from the server 5 (step S113).

Figure 7:
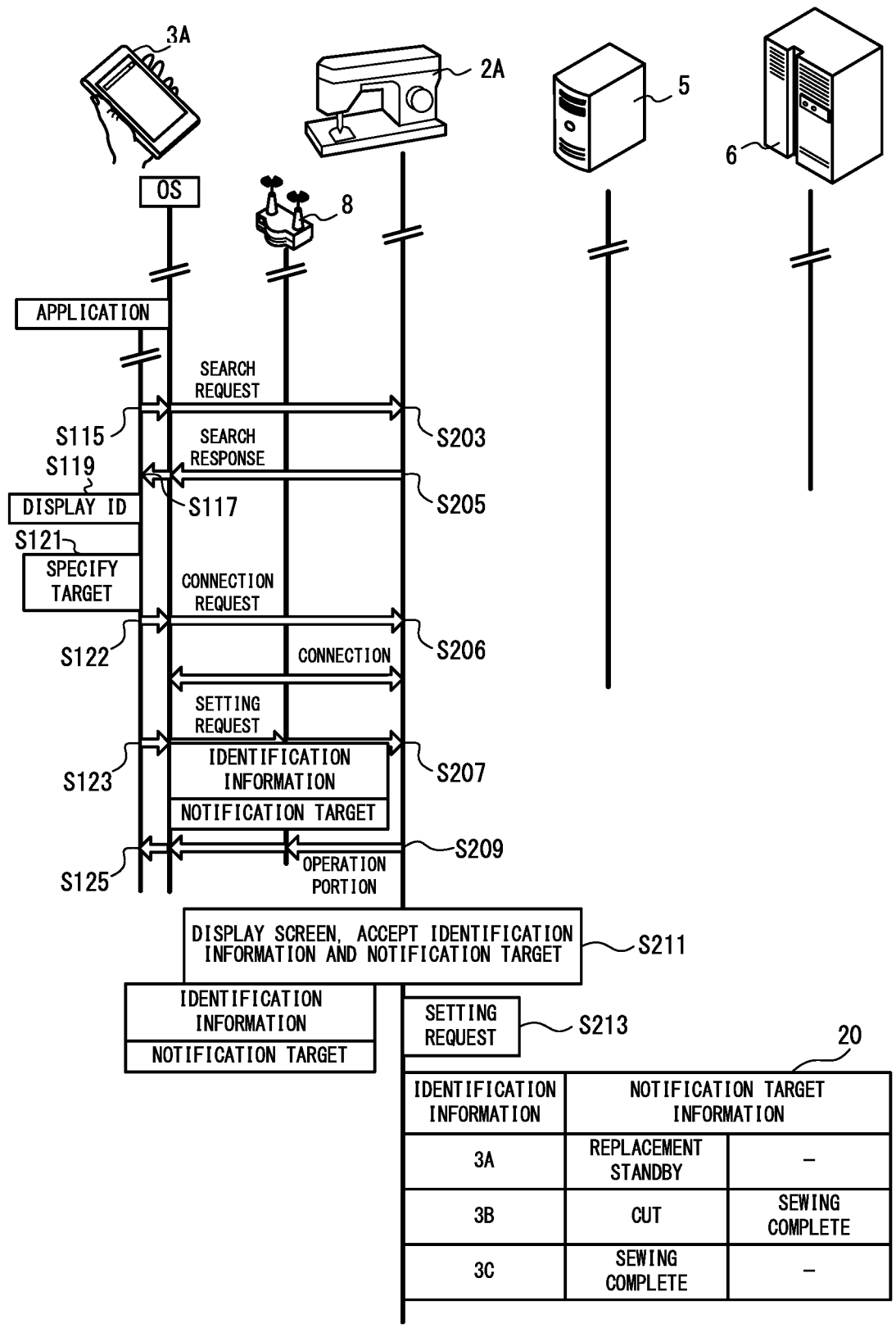
FIG. 7 is a diagram showing a communication sequence of the registration/setting processing, and is a continuation of FIG. 6.

As shown in FIG. 7, using the App transmission function, the information terminal 3A broadcasts, to the LAN 7A, a command (hereinafter referred to as a search request) to search for the sewing machine 2 connected to the LAN 7A (step S115). The sewing machine 2 receives the search request. The sewing machine 2 that has received the search request transmits a search response, to the information terminal 3 via the LAN 7A. An ID of the sewing machine 2 that has transmitted the search response is included in the search response. Using the App reception function, the information terminal 3A receives the search response via the LAN 7A (step S117). The information terminal 3 displays the ID of the sewing machine 2 included in the received search response on the LCD 308, using a display function of the application (hereinafter referred to as an App display function) (step S119). In the present embodiment, an example is given of a case in which at least the sewing machine 2A receives the search request (step S203), and transmits the search response to the information terminal 3A (step S205).

Using the App display function, the information terminal 3A further displays, on the LCD 308, an image on which it is possible to select the category of the sewing status that is the target of the push notification. Candidates of the category of the sewing status that can be selected include the following:

(1) A state in which the sewing using a specified sewing thread is complete, which is a standby state for thread replacement of the sewing thread (hereinafter referred to as a replacement standby state);

(2) A state in which at least one selected from the group of an upper thread and a lower thread used for sewing during the sewing has snapped (hereinafter referred to as a snapped state); and (3) A state in which the sewing of the embroidery pattern is fully complete (hereinafter referred to as a sewing complete state).

The user of the information terminal 3A performs, via the touch panel 305, a touch operation to select one of the IDs displayed on the LCD 308, and to select at least one selected from the group of the candidates (1) to (3) of the category of the sewing status. The information terminal 3A specifies the ID selected by the touch operation, and the candidate (hereinafter referred to as a notification target state) of the category of the sewing status selected by the touch operation (step S121). Hereinafter, a case is given in which the ID of the sewing machine 2A is selected.

Using the App transmission function, the information terminal 3 transmits, via the LAN 7A, a command requesting establishment of a session (referred to as a connection request), to the sewing machine 2A of the ID specified by the processing at step S121 (step S122). At this time, the connection request is relayed by the access point 8. The sewing machine 2A receives, via the LAN 7A, the connection request transmitted from the information terminal 3A (step S206). The sewing machine 2A establishes the session with the information terminal 3A in accordance with the connection request.

Using the App transmission function, the information terminal 3A transmits, via the LAN 7A, a command (referred to as a setting request) including the identification information stored by the processing at step S109, and the notification target information indicating the notification target state specified by the processing at step S121, to the sewing machine 2A of the ID specified by the processing at step S121 (step S123). At this time, the setting request is relayed by the access point 8. The sewing machine 2A receives, via the LAN 7A, the setting request transmitted from the information terminal 3A (step S207). The sewing machine 2A transmits, to the information terminal 3A via the LAN 7A, a command (referred to as a setting response) that notifies that the setting request has been received (step S209). At this time, the setting response is relayed by the access point 8. Using the App reception function, the information terminal 3A receives, via the LAN 7A, the setting response transmitted by the sewing machine 2A (step S125). The sewing machine 2A associates the identification information and the notification target information included in the received setting request with each other, and stores the associated data in the table 20 stored in the storage portion 304 (step S213).

Note that, for example, when the session is established between the information terminals 3A, 3B, and 3C and the sewing machine 2A, the sewing machine 2A receives the setting request from each of the information terminals 3A, 3B, and 3C. In this case, the sewing machine 2A associates the notification target information included in the setting requests received from each of the information terminals 3A, 3B, and 3C with each of the identification information included therein, and stores the respective associated data in the table 20 stored in the storage portion 304 (step S213).

Further, the sewing machine 2A displays an input screen on the LCD 208 (refer to FIG. 2), in accordance with an operation by the user on the operation portion 209 (refer to FIG. 2). The input screen includes an input portion for the identification information of the information terminal 3, and a selection portion by which the selection of the category of the sewing status that is the target of the push notification can be selected. The above-described candidates (1) to (3) are included as candidates for the category of the sewing status that can be selected using the selection portion. The user performs, via the operation portion 209, an input operation to input the identification information, and a selection operation to select at least one selected from the group of the candidates (1) to (3) of the category of the sewing status. The sewing machine 2A accepts the identification information input by the input operation, and the notification target state that is the candidate of the category of the sewing status selected by the selection operation (step S211). The sewing machine 2A associates the accepted identification information with the notification target information that indicates the notification target state, and stores the associated data in the table 20 stored in the storage portion 304 (step S213). In other words, the sewing machine 2A can store the identification information and the notification target information in the table 20 in accordance with receiving the setting request from the information terminal 3 or in accordance with accepting the operation on the input screen.

First Communication Processing

A communication sequence when first communication processing is performed in the monitoring system 1 will be explained with reference to FIG. 8. In the first communication processing, the user of the information terminal 3 is notified of the sewing status, on the basis of information transmitted from the sewing machine 2 in accordance with a periodic request from the information terminal 3. Note that, for the communication sequence shown in FIG. 8, it is assumed that the session between the sewing machine 2A and the information terminal 3A is established. Further, it is assumed that the application is already activated in the information terminal 3A, the OS is not in a sleep mode, and the application is being executed in the foreground.

The sewing machine 2A constantly detects the sewing status of itself, and when the detected sewing status has changed (step S241), the sewing machine 2A stores, in the storage portion 204, sewing status information indicating the sewing status after the change (step S243). Note that, changing of the sewing status means, for example, a case in which the state is changed to the above-described states (1) to (3) from when the sewing operation is being performed normally (a normal sewing operation state). In the information terminal 3A, when the application is being executed in the foreground, using the App transmission function, the information terminal 3A transmits, via the LAN 7A, a command requesting the sewing status information (referred to as a status request), to the sewing machine 2 of the ID specified by the processing at step S121 (refer to FIG. 7) (step S141). At this time, the status request is relayed by the access point 8. The sewing machine 2A receives, via the LAN 7A, the status request transmitted from the information terminal 3A (step S245).

When the sewing status information is stored in the storage portion 204 by the processing at step S243, the sewing machine 2A acquires the sewing status information (step S247). The sewing machine 2A transmits, via the LAN 7A, a command including the acquired sewing status information (referred to as a status response), to the information terminal 3A that has transmitted the status request (step S249). At this time, the status response is relayed by the access point 8. Using the App reception function, the information terminal 3A receives, via the LAN 7A, the status response transmitted from the sewing machine 2A (step S143). Using the App display function, the information terminal 3A displayed, on the LCD 308, the sewing status indicated by the sewing status information including the received status response (step S145). In this way, the sewing status of the sewing machine 2A is notified to the user of the information terminal 3A. As described above, since the information terminal 3A periodically transmits the status request, the information terminal 3A periodically displays the sewing status of the sewing machine 2A on the LCD 308.

Note that, specific examples of the sewing status information included in the status response transmitted from the sewing machine 2A by the processing at step S249 include the progress status of the sewing, the number of stitches for which the sewing is complete, the remaining time until the sewing is complete, the ratio of the portion, of the embroidery pattern as a whole, for which the sewing is complete, and the like. Thus, the information terminal 3A can notify the user of the sewing status by displaying these pieces of information on the LCD 308.

Second Communication Processing

A case when second communication processing is performed in the monitoring system 1 will be explained with reference to FIG. 9 to FIG. 11. In the second communication processing, on the basis of a push notification request transmitted from the sewing machine 2A, the push notification is performed in the information terminal 3A, and a message indicating the sewing status is notified to the user. Note that, for the communication sequence shown in FIG. 9, it is assumed that the session between the sewing machine 2A and the information terminal 3A is established. Further, it is assumed that the application is already activated in the information terminal 3A, the OS is not in the sleep mode, and the application is being executed in the foreground. Furthermore, it is assumed that the table 20 shown in FIG. 7 is stored in the storage portion 204 of the sewing machine 2A. For example, the communication sequence shown in FIG. 9 is executed in parallel with the communication sequence shown in FIG. 8.

Figure 9:
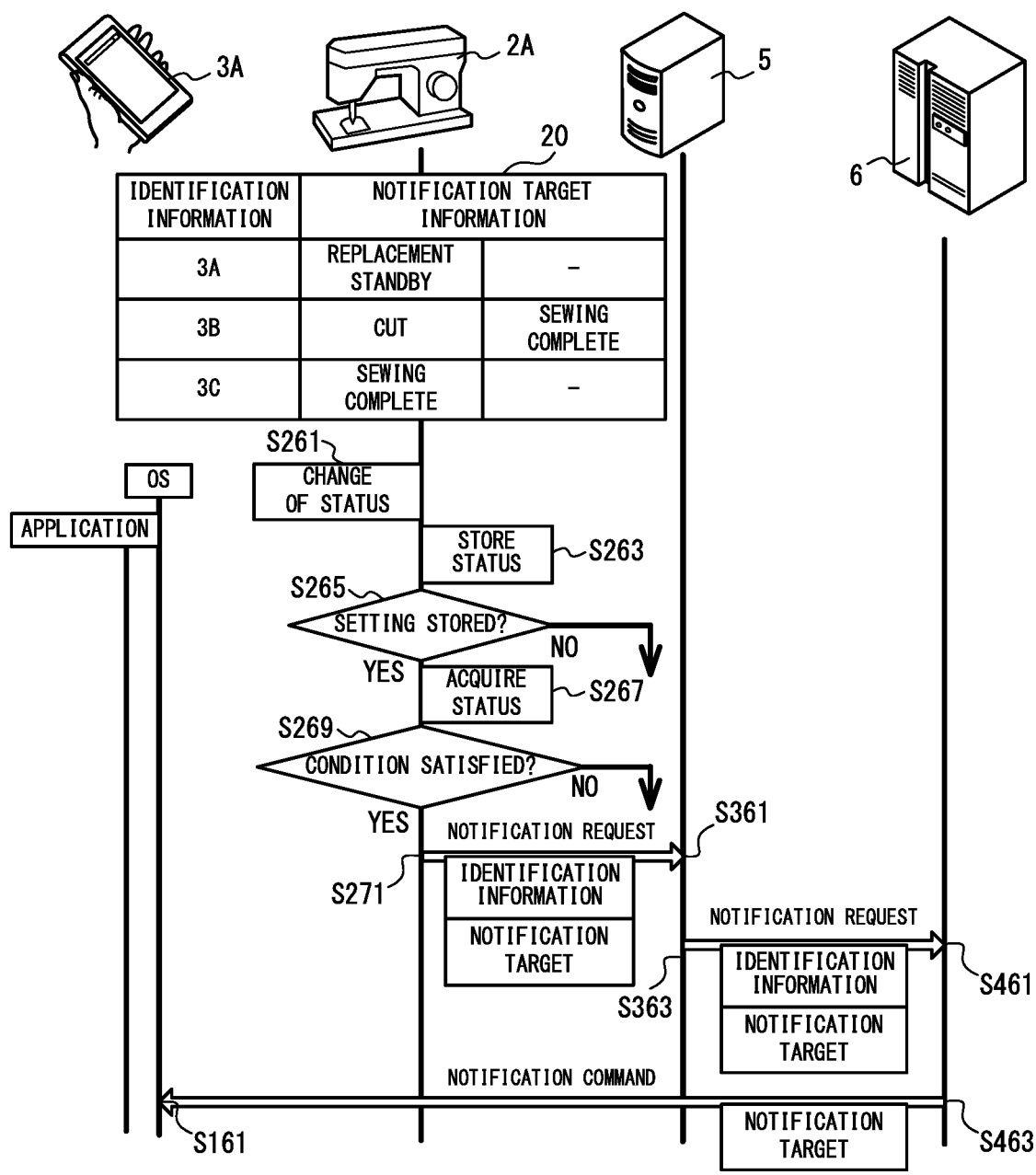
FIG. 9 is a diagram showing a communication sequence of second notification processing (application in foreground)

As shown in FIG. 9, the sewing machine 2A constantly detects the sewing status of itself, and when the detected sewing status has changed (step S261), the sewing machine 2A stores, in the storage portion 204, the sewing status information indicating the sewing status after the change (step S263). Next, the sewing machine 2A determines whether the identification information and the notification target information are stored in the table 20 (step S265). When the identification information and the notification target information are not stored in the table 20 (no at step S265), the sewing machine 2A determines that the setting for executing the push notification in the information terminal 3 has not been accepted, and ends the second communication processing.

When the identification information and the notification target information are stored in the table 20 (yes at step S265), the sewing machine 2A determines that the setting for executing the push notification in the information terminal 3 has been accepted, and advances the processing to step S267. The sewing machine 2A acquires the sewing status information stored in the storage portion 204 (step S267). The sewing machine 2A determines whether a predetermined condition for executing the push notification in the information terminal 3 is satisfied (step S269), in accordance with whether or not the acquired sewing status information matches one of the pieces of notification target information stored in the table 20. When the acquired sewing status information does not match one of the pieces of notification target information stored in the table 20, the sewing machine 2A determines that the predetermined condition is not satisfied (no at step S269). In this case, since it is not necessary to cause the push notification to be executed in the information terminal 3, the sewing machine 2A ends the second communication processing.

When the acquired sewing status information matches one of the pieces of notification target information stored in the table 20, the sewing machine 2A determines that the predetermined condition is satisfied (yes at step S269). For example, when the sewing status information indicating the replacement standby state is stored in the storage portion 204, the sewing status information matches the notification target information associated with the identification information "3A" of the table 20, and thus, it is determined that the predetermined condition is satisfied. In this case, since it is necessary to cause the push notification to be executed in the information terminal 3, the sewing machine 2A performs the following processing, in order to cause the push notification to be executed in the information terminal 3A of the identification information "3A" corresponding to the notification target information determined to have matched, of the table 20.

In order to request that the command instructing the push notification (referred to as the notification command) be sent from the server 6 to the information terminal 3A, the sewing machine 2A transmits a command (referred to as a notification request) to the server 5, via the LAN 7A and the public network 7B (step S271). At this time, the notification request is relayed by the access point 8. The notification request includes the identification information of the information terminal 3A, and the notification target information necessary for notifying, using the push notification, the sewing status acquired from the storage portion 204 by the processing at step S267. Note that the notification target information is flag information indicating the category of the sewing status, and does not include detailed information indicating the sewing status. On the other hand, the sewing status information included in the status response transmitted from the sewing machine 2A by the processing at step S249 (refer to FIG. 8) includes, for example, the progress status of the sewing, the number of stitches for which the sewing is complete, the remaining time until the sewing is complete, the ratio of the portion, of the embroidery pattern as a whole, for which the sewing is complete, and the like. Thus, an information amount of the notification target information is smaller than an information amount of the sewing status information. The server 5 receives the notification request via the public network 7B (step S361).

The server 5 acquires the identification information included in the received notification request. When the identification information matching the acquired identification information is stored in the storage portion 504 by the processing at step S303 (refer to FIG. 6) of the registration/setting processing, the server 5 determines that the notification request is valid. In this case, the server 5 transmits the received notification request to the server 6, via the public network 7B (step S363). The server 6 receives the notification request, via the public network 7B (step S461).

The server 6 acquires the identification information included in the received notification request. When the identification information matching the acquired identification information is generated and stored in the storage portion 604 by the processing at step S403 (refer to FIG. 6) of the registration/setting processing, the server 6 determines that the notification request is valid. In this case, the server 6 specifies the information terminal 3A identified by the acquired identification information. Furthermore, the server 6 acquires the notification target information included in the notification request. The server 6 transmits, to the information terminal 3A via the public network 7B, a command (referred to as the notification command) instructing the push notification for notifying the notification target state indicated by the acquired notification target information (step S463). The notification command includes the notification target information.

Using a reception function of the OS (referred to as an OS reception function), the information terminal 3A receives, via the public network 7B, the notification command transmitted from the server 6 (step S161). Note that, in the information terminal 3A, the OS is not in the sleep mode, and the application is being continuously executed in the foreground. In this case, the information terminal 3A does not execute the push notification, regardless of the notification command. More specifically, the application that is being executed in the foreground monitors a push notification function of the OS, and disables the push notification by the OS. The reason for this is that the application is being executed in the foreground, and the sewing status is being displayed on the LCD 308 as a result of the first communication processing (refer to FIG. 8) being performed, and thus, the push notification is not necessary.

Figure 10:
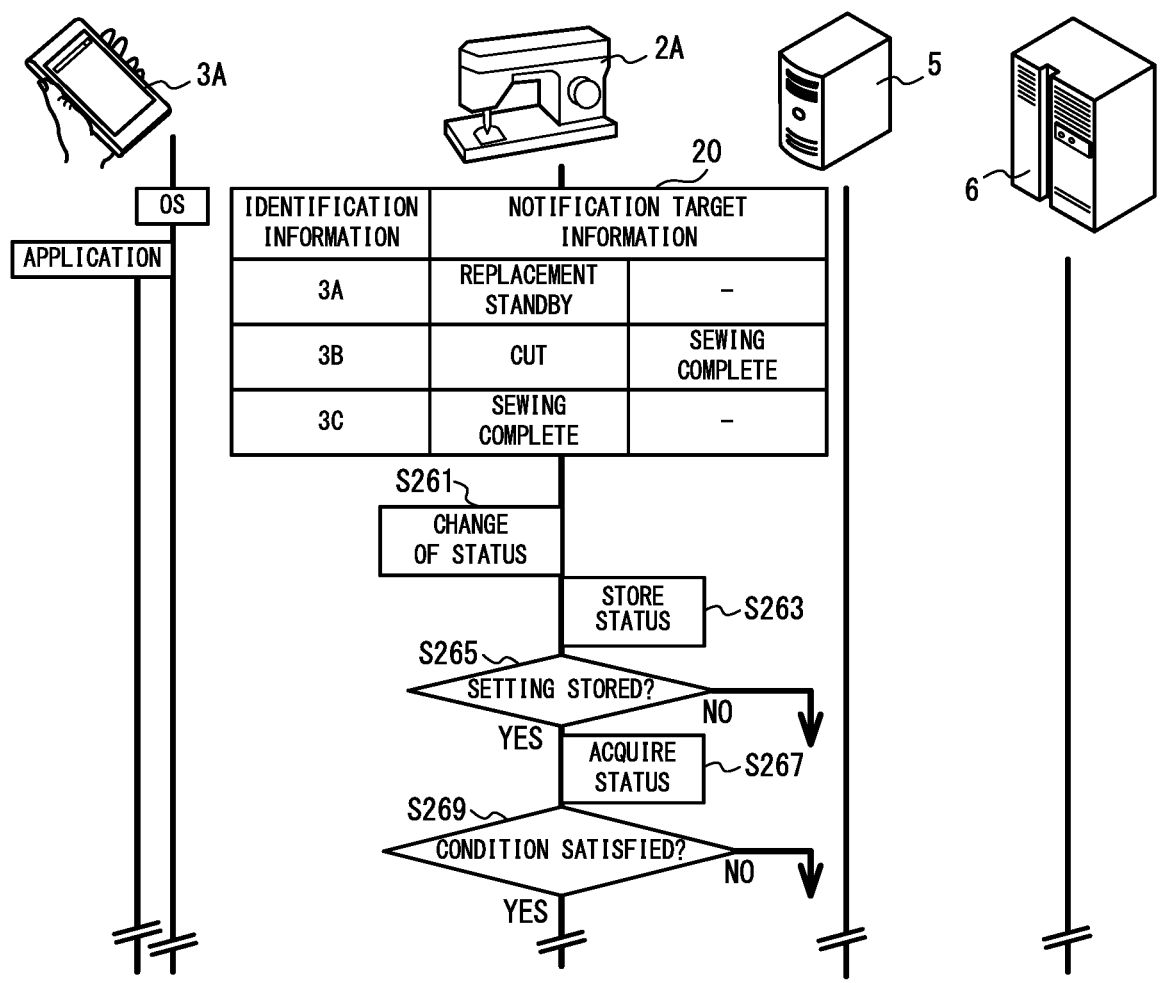
FIG. 10 is a diagram showing a communication sequence of the second notification processing (application in background)
Figure 11:
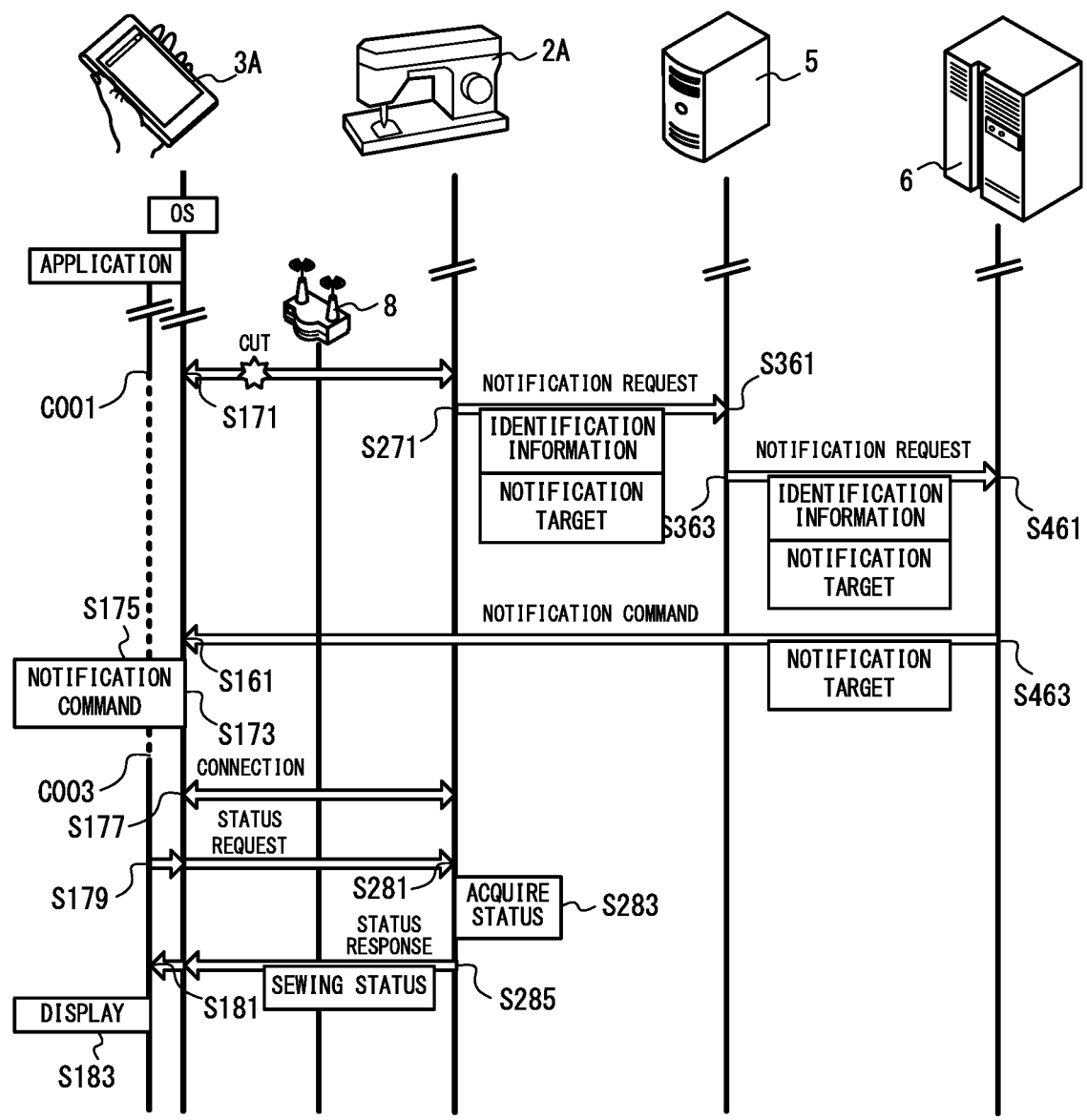
FIG. 11 is a diagram showing a communication sequence of the second notification processing (application in background), and is a continuation of FIG. 10.

On the other hand, the communication sequence shown in FIG. 11 is performed after the communication sequence shown in FIG. 10 that is common to a part of that shown in FIG. 9. As shown in FIG. 11, a case is exemplified in which, in the information terminal 3A, for example, the OS is not in the sleep mode, the application is changed from the state of being executed in the foreground to a state of being executed in the background (C001), and the session between the information terminal 3A and the sewing machine 2A has been disconnected (step S171). In this state, using the OS reception function, the information terminal 3A receives, via the public network 7B, the notification command transmitted from the server 6 (step S173). In this case, the information terminal 3A acquires the notification target information included in the notification command. Using a display function of the OS (referred to as an OS display function), the information terminal 3A displays, on the LCD 308, the push notification for notifying the user of the notification target state indicated by the acquired notification target information (step S175).

Furthermore, a case is exemplified in which, after executing the push notification, the application changes from the state of being executed in the background to the state of being executed in the foreground (C003), and the session between the information terminal 3A and the sewing machine 2A has been re-established (step S177). In this case, using the App transmission function, the information terminal 3A transmits the status request to the sewing machine 2A, via the LAN 7A (step S179). At this time, the status request is relayed by the access point 8. The sewing machine 2A receives, via the LAN 7A, the status request transmitted from the information terminal 3A (step S281).

When the sewing status information is stored in the storage portion 204 by the processing at step S263, the sewing machine 2A acquires the sewing status information (step S283). The sewing machine 2A transmits, via the LAN 7A, the status response including the acquired sewing status information to the information terminal 3A that has transmitted the status request (step S285). At this time, the status response is relayed by the access point 8. Using the App reception function, the information terminal 3A receives, via the LAN 7A, the status response transmitted from the sewing machine 2A (step S181). Using the App display function, the information terminal 3A displays, on the LCD 308, the sewing status indicated by the sewing status information included in the received status response (step S183). In this way, the sewing status of the sewing machine 2A is notified to the user of the information terminal 3A. Note that the sewing status information included in the status response includes, for example, the progress status of the sewing, the number of stitches for which the sewing is complete, the remaining time until the sewing is complete, the ratio of the portion, of the embroidery pattern as a whole, for which the sewing is complete, and the like. Thus, in the processing at step S183, these pieces of information are displayed on the LCD 308. In other words, the sewing status displayed by the processing at step S183 is information that is more detailed than the notification target state notified by the push notification by the processing at step S175.

Activation Processing

Figure 12:
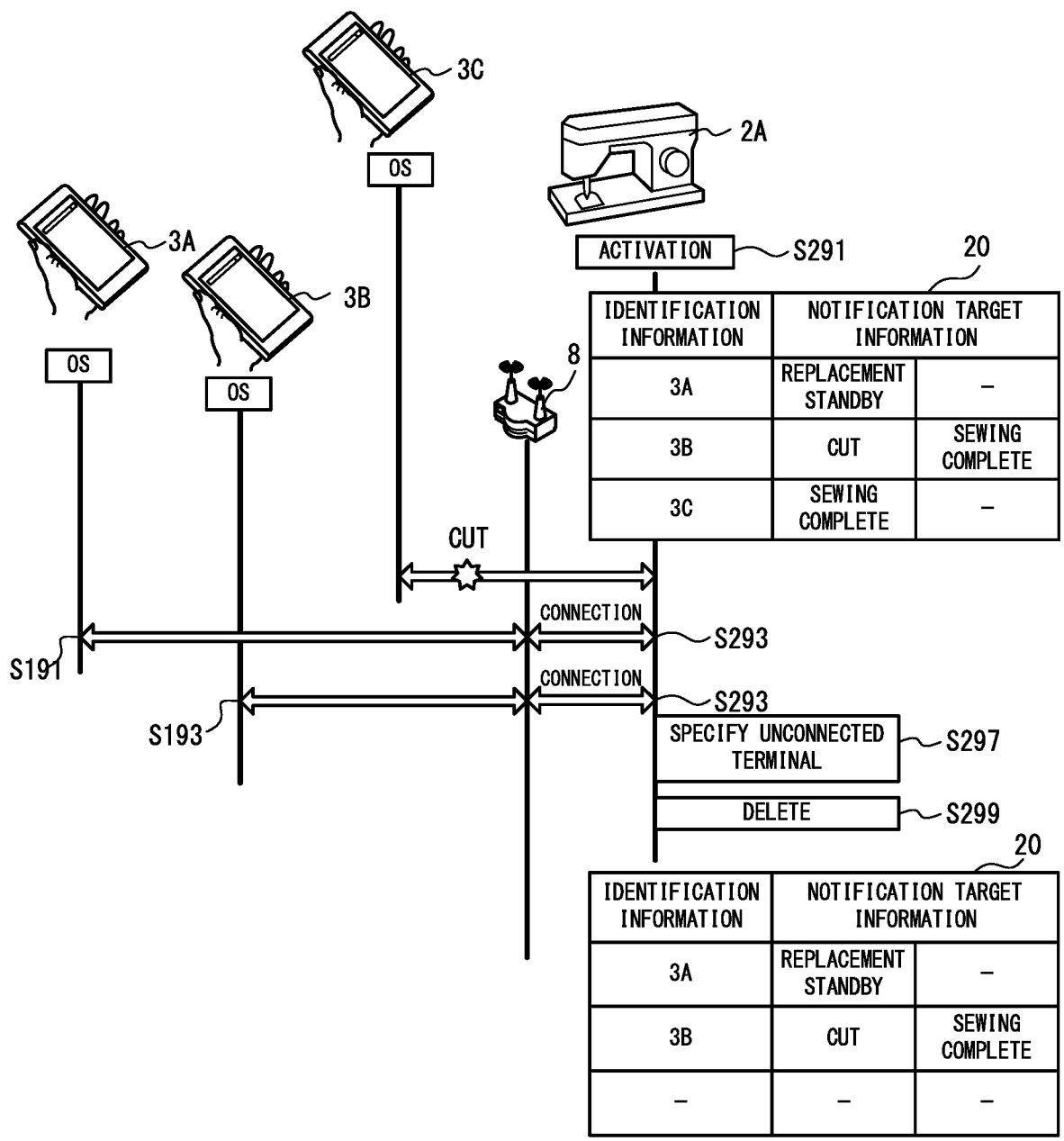
FIG. 12 is a diagram showing a communication sequence of activation processing.

A communication sequence when activation processing is performed in the monitoring system 1 will be explained with reference to FIG. 12. In the activation processing, unnecessary information in the table 20 is deleted when the sewing machine 2 is activated. Note that, in the communication sequence shown in FIG. 12, it is assumed that the sewing machine 2A has been re-activated once more by being switched on, after the power supply of the sewing machine 2A has been switched off in a state in which the identification information and the notification target information are stored in the table 20. The session between the sewing machine 2A and the information terminal 3A has been disconnected in accordance with the power supply of the sewing machine 2A being switched off. The table 20 is maintained in a state of storing the same information as the table 20 shown in FIG. 7.

The sewing machine 2A is activated by switching on the power supply (step S291). The sewing machine 2A is connected to the LAN 7A (step S293). Further, each of the information terminals 3A and 3B is continuously connected to the LAN 7A using the OS connection function (step S191, and step S193). Here, a case is exemplified in which the session between the information terminal 3C and the sewing machine 2A has been disconnected.

The sewing machine 2A verifies whether or not communication is possible with the information terminal 3 identified by the identification information stored in the table 20. Of the information terminals 3A to 3C identified by the identification information stored in the table 20, the sewing machine 2A specifies the information terminal 3C with which the session cannot be established via the LAN 7A (step S297). The sewing machine 2A deletes the identification information identifying the specified information terminal 3C from the table 20 (step S299). In addition, the sewing machine 2A further deletes, from the table 20, the notification target information associated with the deleted identification information (step S299). The sewing machine 2A performs the first communication processing (refer to FIG. 8), and the second communication processing (refer to FIG. 9 to FIG. 11), on the basis of the table 20 updated in the manner described above.

Actions and Effects of Present Embodiment

In the monitoring system 1, using the App transmission function, the information terminal 3 transmits the status request to the sewing machine 2 (step S141), and receives, using the App reception function, the status response transmitted from the sewing machine 2 in response to this status request (step S143). Using the App display function, the information terminal 3 displays, on the LCD 308, the sewing status indicated by the sewing status information included in the received status response (step S145), and thus notifies the user. Here, when the application is being executed in the background, the information terminal 3 cannot use the App transmission function, and is thus not able to transmit the status request to the sewing machine 2, nor is able to receive the status response from the sewing machine 2. This also applies to a case in which the session between the information terminal 3 and the access point 8 is disconnected. In response to this, in this type of case, the information terminal 3 receives the notification command from the server 6 via the public network 7B, using the OS reception function (step S173), and displays the push notification on the LCD 308 (step S175). As a result, the information terminal 3 can notify the user of the sewing status of the sewing machine 2, even when the application is being executed in the background, or when the session with the access point 8 has been disconnected.

Figure 8:
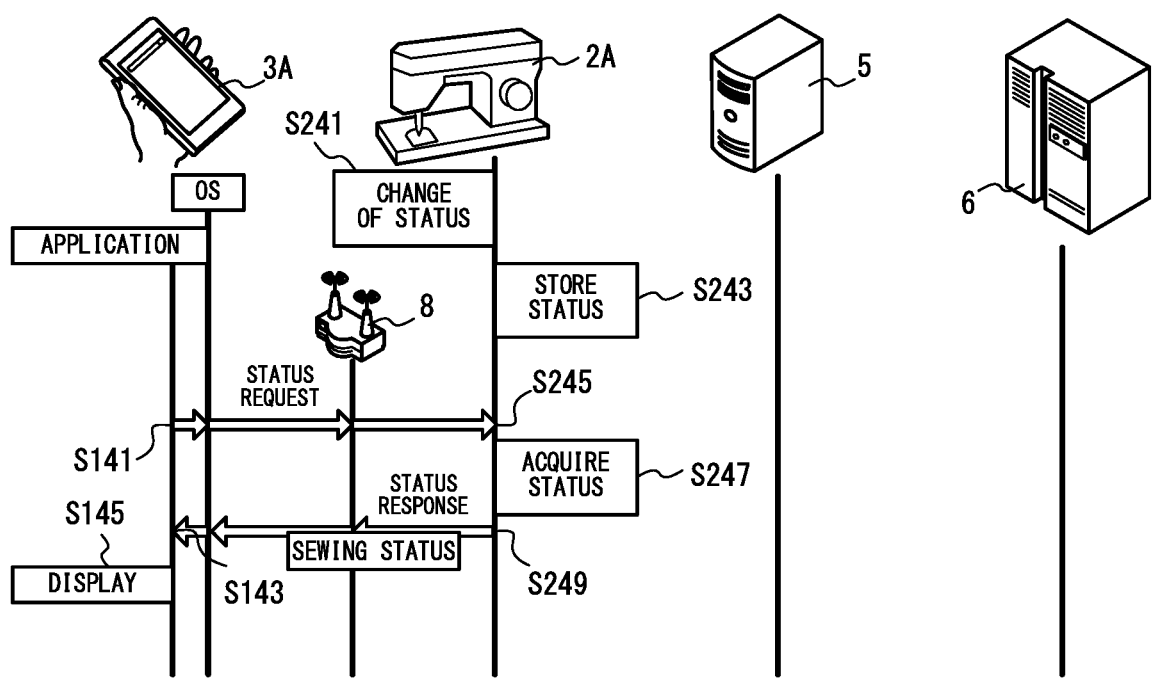
FIG. 8 is a diagram showing a communication sequence of first notification processing.

When the application is being executed in the foreground (refer to FIG. 8 and FIG. 9), as shown in FIG. 8, the information terminal 3 can transmit the status request to the sewing machine 2 using the App transmission function (step S141), can receive the status response from the sewing machine 2 using the App reception function (step S143), and can display the sewing status on the LCD 308 (step S145). On the other hand, when the application is being executed in the background, using the OS reception function, the information terminal 3 can receive the notification command transmitted from the server 6 (step S173), and can display the push notification on the LCD 308 (step S175). Furthermore, when the application is being executed in the foreground, even when the information terminal 3 receives the notification command from the server 6 using the OS reception function, the information terminal 3 does not display the push notification (refer to FIG. 9). In this way, the information terminal 3 can suppress duplication of the display of the sewing status and of the push notification.

In the information terminal 3, there is a case in which, after the push notification is displayed on the LCD 308 (step S175) in accordance with the reception of the notification command (step S173), there is a change from the state of the application being executed in the background to a state in which the application is executed in the foreground (C0003). In this type of case, the information terminal 3 transmits the status request to the sewing machine 2 (step S179), receives the status response from the sewing machine 2 (step S181), and displays the sewing status on the LCD 308. In this way, the information terminal 3 can further notify the user of the sewing status in more detail, after notifying the user of an overview of the sewing status using the push notification. Further, the information amount of the notification target information included in the notification request and the notification command communicated via the public network 7B is smaller than the information amount of the sewing status information included in the status response communicated via the LAN 7A. Thus, the information terminal 3 can further notify the user of the sewing status in more detail as necessary, while suppressing the information amount of the communication via the public network 7B.

The sewing machine 2 displays the input screen on the LCD 208, and accepts the identification information of the information terminal 3, and the notification target state that is the target of the push notification (step S211). The sewing machine 2 associates the received identification information with the notification target information indicating the notification target state, and stores the associated data in the table 20 (step S213). In this way, the sewing machine 2 can directly accept, from the user, the setting to transmit the notification request of the push notification to the server 5. Thus, with respect to the sewing machine 2, the user can freely perform the setting of the information terminal 3 that performs the push notification, and the setting of the conditions of the notification target state that is the target of the push notification. Thus, the user can freely customize the settings relating to the notification of the sewing status.

The information terminal 3 transmits, to the sewing machine 2, the setting request including the identification information and the notification target information (step S123). The sewing machine 2 receives the setting request transmitted from the information terminal 3 (step S207), associates the identification information and the notification target information included in the setting request with each other, and stores the associated data in the table 20 (step S213). In this way, the sewing machine 2 can accept the setting to transmit the notification request of the push notification to the server 5, from the user, via the information terminal 3. Thus, the user can perform, on the sewing machine 2 via the information terminal 3, the setting of the information terminal 3 that performs the push notification, and the setting of the conditions of the sewing status that is the target of the push notification.

When the sewing status indicated by the sewing status information stored in the storage portion 204 matches at least one selected from the group of the notification target states (i.e. (1) the replacement standby state, (2) the snapped state, and (3) the sewing complete state) stored as the notification target information in the table 20, the sewing machine 2 determines that the predetermined condition for causing the push notification to be executed in the information terminal 3 is satisfied (yes at step S269), and transmits the notification request to the server 5 (step S271). Thus, when a state is obtained in which the sewing machine 2 is standing by for the replacement of the sewing thread, when a state is obtained in which the upper thread or the lower thread used in the sewing has snapped, and when a state is obtained in which the sewing is complete, the information terminal 3 can notify the user using the push notification.

When the sewing machine 2 is activated, of the identification information stored in the table 20, the sewing machine 2 deletes the identification information identifying the information terminal 3 with which the session cannot be established via the LAN 7A (step S299). In addition, the sewing machine 2 further deletes, from the table 20, the notification target information associated with the deleted identification information (step S299). In this way, the sewing machine 2 can prevent the unnecessary notification request from being transmitted to the servers 5 and 6, and the notification command from being transmitted from the server 6 to the information terminal 3. Further, by adjusting the number of the information terminal 3 for which the push notification is requested, the sewing machine 2 can reduce a processing load.

Modified Examples

The present disclosure is not limited to the above-described embodiment, and various modifications are possible.

The information terminal 3 is not limited to the smart phone, and may be a PC, a tablet PC, a dedicated device provided with the LCD 308, and the like. The sewing machine 2 may be configured to be directly connectable to the public network 7B without being connected via the access point 8. The monitoring system 1 need not necessarily include the server 5. In this case, for example, in order to request that the notification command be transmitted to the information terminal 3 from the server 6, the sewing machine 2 may transmit the notification request directly to the server 6 via the LAN 7A and the public network 7B. The sewing machine 2 and the information terminal 3 may be directly connected by wireless direct (Wi-Fi Direct), without being connected via the access point 8.

In place of the sewing status information, information necessary when performing the notification in the information terminal 3 of the sewing status (flag information and the like for specifying the category of the sewing status, for example) may be included in the status response transmitted from the sewing machine 2 to the information terminal 3. In place of the notification target information, information necessary for performing the notification of the notification target state, using the push notification (flag information or the like for specifying a type of the push notification, for example) may be included in the notification request transmitted from the sewing machine 2 to the servers 5 and 6. Similarly, in place of the notification target information, information necessary for performing the notification of the notification target state, using the push notification (flag information or the like for specifying the type of the push notification, for example) may be only included in the notification command transmitted from the server 6 to the information terminal 3. On the other hand, in place of the notification target information, the sewing status information may be included in the notification request transmitted from the sewing machine 2 to the servers 5 and 6. In this case, the sewing status information, that is, the same information, may be included in the status response and the notification request transmitted from the sewing machine 2.

When the OS is in the sleep mode, even when the application is being executed in the foreground, the information terminal 3 is unable to transmit the status request to the sewing machine 2 using the App transmission function, and thus, the information terminal 3 cannot receive the status response from the sewing machine 2 and cannot display the sewing status on the LCD 308. In contrast to this, when the OS is in the sleep mode, regardless of the execution mode of the application (being executed in the foreground, or being executed in the background), the notification command transmitted from the server 6 may be received by the OS reception function (step S173), and the push notification for performing notification of the sewing status may be displayed on the LCD 308 by the OS display function (step S175).

Even when the OS is not in the sleep mode, and the application is being executed in the foreground, the information terminal 3 may perform the push notification when the information terminal 3 has received the notification command from the server 6. In other words, the information terminal 3 may always perform the push notification, regardless of the execution mode of the OS (the sleep mode or not), and regardless of the execution mode of the application. After the information terminal 3 has displayed the push notification on the LCD 308 (step S175), when the state of the application has been changed from being executed in the background to being executed in the foreground, the sewing status is already notified by the push notification, and thus, the information terminal 3 need not necessarily transmit the status request to the sewing machine 2.

Even when the OS is not in the sleep mode, and the application is being executed in the foreground, the information terminal 3 may perform the push notification in accordance with having received the notification command from the server 6 when a specific condition is satisfied. For example, even when the OS is not in the sleep mode and the application is being executed in the foreground, when a screen different from the screen showing the sewing status is being displayed on the LCD 308, the information terminal 3 may perform the push notification in accordance with having received the notification command from the server 6.

After the information terminal 3 has displayed the push notification on the LCD 308 (step S175), when the state of the application has been changed from being executed in the background to being executed in the foreground (C003), during a period until the information terminal 3 receives the status response (step S181) from the sewing machine 2 in accordance with transmitting the status request to the sewing machine 2 (step S179), the information terminal 3 may store the category of the sewing status notified by the push notification in the RAM 203. The information terminal 3 may display the sewing status included in the status response on the LCD 308 only when the category of the sewing status notified by the push notification and the category of the sewing status included in the status response match each other. In this way, when the sewing status of the sewing machine 2 has changed during the period from when the push notification is performed (step S175) to when the status response is received (step S181), the information terminal 3 can suppress a situation in which the sewing status of a different category is associated and notified to the user.

Storage processing of the identification information and the notification target information with respect to the table 20 may be performed in the server 5. The server 5 may transmit the table 20 in which the information is stored to the sewing machine 2. By receiving the table 20 transmitted from the server 5, the sewing machine 2 may accept the setting to transmit the notification request of the push notification to the server 5.

The sewing status stored as the notification target information in the table 20 is not limited to (1) the replacement standby state, (2) the snapped state, and (3) the sewing complete state, and may be another sewing status. For example, the sewing machine 2 may be configured to be able to also store, in the table 20, (4) a state in which the sewing has stopped due to an error occurring in the sewing machine 2 (referred to as an error occurrence state), as the notification target information. In other words, when the sewing status indicated by the sewing status information stored in the storage portion 204 matches at least one selected from the group of the notification target states stored in the table 20 as the notification target information, that is (1) the replacement standby state, (2) the snapped state, (3) the sewing complete state, and (4) the error occurrence state, the sewing machine 2 determines that the predetermined condition for causing the push notification to be performed in the information terminal 3 is satisfied (yes at step S269), and transmits the notification request to the server 5 (step S271). Furthermore, the sewing status information indicating a sewing status other than (1) to (4) described above may be stored in the table 20. In this case, when the sewing status other than (1) to (4) matches the sewing status indicated by the sewing status information stored in the storage portion 204, the sewing machine 2 may determine that the predetermined condition for causing the push notification to be performed in the information terminal 3 is satisfied.

When the sewing status information stored in the storage portion 204 matches at least one selected from the group of the pieces of notification target information of the table 20, the sewing machine 2 may verify an establishment state of the session with the information terminal 3, before transmitting the notification request to the server 5. When the session with the information terminal 3 identified by the identification information associated with the notification target information, of the table 20, matching the sewing status information is disconnected, the sewing machine 2 need not necessarily transmit the notification request to the server 5, and may delete, from the table 20, the identification information identifying the information terminal 3 with which the session has been disconnected. At the same time, the sewing machine 2 may further delete, from the table 20, the notification target information associated with the deleted identification information.

The communication sequence of the second communication processing shown in FIG. 9 may be performed after the communication sequence of the first communication processing shown in FIG. 8.

When the sewing status of the sewing machine 2 itself has changed, in order to indicate that the sewing status has changed, the sewing machine 2 may store "1" in flag information stored in the storage portion 204, and may turn the flag information ON. When the sewing machine 2 has received the status request transmitted from the information terminal 3 (step S245), when the flag information is ON, the sewing machine 2 may acquire the sewing status of a current time point (step S247). Further, when the sewing status of the sewing machine 2 itself has changed, the sewing machine 2 may perform the determination as to whether the identification information and the notification target information are stored in the table 20 (step S265), and the determination as to whether or not the sewing status information indicating the sewing status of the current time point matches at least one selected from the group of the pieces of notification target information stored in the table 20 (step S269). In these cases, the sewing machine 2 need not necessarily store the sewing status information after the change in the storage portion 204.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A monitoring system comprising:
a sewing machine that performs sewing,
an information terminal including a display portion, and
a server, wherein
the sewing machine and the information terminal communicate via a LAN,
the sewing machine and the server communicate via a public network,
the information terminal and the server communicate via the public network,
the sewing machine includes
a first processor, and
a first memory configured to store computer-readable instructions that, when executed by the first processor, instruct the first processor to perform a process comprising:
acquisition processing of acquiring, when a sewing status of the sewing machine changes, the sewing status after the change,
the information terminal includes
a second processor, and
a second memory configured to store computer-readable instructions that, when executed by the second processor, instruct the second processor to perform a process comprising:
first terminal transmission processing of using an App transmission function to transmit, to the sewing machine via the LAN, a status request requesting the sewing status, the App transmission function being a transmission function of an application executed on an operating system,
the computer-readable instructions instruct the first processor to perform processes comprising:
first sewing machine reception processing of receiving, via the LAN, the status request transmitted from the information terminal, and
first sewing machine transmission processing of transmitting, to the information terminal via the LAN, first status information that accords with the sewing status acquired by the acquisition processing, when the status request is received by the first sewing machine reception processing,
the computer-readable instructions instruct the second processor to perform processes comprising:
first terminal reception processing of using an App reception function to receive, via the LAN, the first status information transmitted from the sewing machine, the App reception function being a reception function of the application, and
first terminal display processing of using an App display function to display, on the display portion, the sewing status represented by the received first status information, when the first status information is received by the first terminal reception processing, the App display function being a display function of the application,
the computer-readable instructions instruct the first processor to perform a process comprising:
second sewing machine transmission processing of transmitting, to the server via the public network, a notification request including second status information that accords with the sewing status, and identification information identifying the information terminal, when the sewing status acquired by the acquisition processing satisfies a predetermined condition,
the server includes
a third processor, and
a third memory configured to store computer-readable instructions that, when executed by the third processor, instruct the third processor to perform processes comprising:
server reception processing of receiving, via the public network, the notification request transmitted from the sewing machine; and
server transmission processing of transmitting, via the public network, to the information terminal identified by the identification information included in the received notification request, a notification command instructing a push notification for notifying the sewing status represented by the second status information included in the notification request received by the server reception processing, and the computer-readable instructions instruct the second processor to perform processes comprising:

second terminal reception processing of using an OS reception function to receive, via the public network, the notification command transmitted from the server, the OS reception function being a reception function of the operating system, and second terminal display processing of using an OS display function to display, on the display portion, the push notification for notifying the sewing status, when the notification command is received by the second terminal reception processing, the OS display function being a display function of the operating system.

2. The monitoring system according to claim 1, wherein the second terminal display processing includes using the OS display function to display the push notification on the display portion, when the application is being executed in a background when the notification command is received via the public network using the OS reception function, or when the operating system is in a sleep mode, and not using the OS display function to display the push notification on the display portion, when the operating system is not in the sleep mode when the notification command is received via the public network using the OS reception function, and the application is being executed in a foreground.

3. The monitoring system according to claim 1, wherein the second terminal display processing includes using the OS display function to display the push notification on the display portion, when the application is being executed in a background when the notification command is received via the public network using the OS reception function, and the computer-readable instructions instruct the second processor to perform processes comprising:

second terminal transmission processing of using the App transmission function to transmit the status request to the sewing machine, via the LAN, when, after the display of the push notification on the display portion by the second terminal display processing, a state changes from the application being executed in the background to the application being executed in a foreground;

third terminal reception processing of using the App reception function to receive, via the LAN, the first status information transmitted from the sewing machine in accordance with the status request transmitted by the second terminal transmission processing; and third terminal display processing of using the App display function to display, on the display portion, the sewing status represented by the received first status information, when the first status information is received by the third terminal reception processing.

4. The monitoring system according to claim 1, wherein an information amount of the first status information is larger than an information amount of the second status information.

5. The monitoring system according to claim 1, wherein the computer-readable instructions instruct the first processor to perform a process comprising:

acceptance processing of accepting a setting for transmitting the notification request, and the second sewing machine transmission processing includes transmitting the notification request to the server via the public network, when the setting for transmitting the notification request is accepted by the acceptance processing, and the sewing status acquired by the acquisition processing satisfies the predetermined condition, and not transmitting the notification request to the server, when the setting for transmitting the notification request is not accepted by the acceptance processing.

6. The monitoring system according to claim 5, wherein the acceptance processing includes accepting the predetermined condition, and the second sewing machine transmission processing includes transmitting the notification request to the server via the public network, when the sewing status acquired by the acquisition processing satisfies the predetermined condition accepted by the acceptance processing, and not transmitting the notification request to the server, when the sewing status acquired by the acquisition processing does not satisfy the predetermined condition accepted by the acceptance processing.

7. The monitoring system according to claim 1, wherein the computer-readable instructions instruct the first processor to perform a process comprising:

determining that the sewing status acquired by the acquisition processing satisfies the predetermined condition when the state is at least one selected from the group of a state of standing by to replace a sewing thread, a state in which at least one selected from the group of an upper thread and a lower thread used for sewing has snapped, a state in which sewing is complete, and a state in which sewing is stopped due to occurrence of an error.

8. The monitoring system according to claim 5, wherein the computer-readable instructions further instruct the second processor to perform a process comprising:

third terminal transmission processing of using the App transmission function to transmit, to the sewing machine via the LAN, a setting request including the identification information, the setting request requesting a setting as to whether the sewing machine transmits the notification request to the server, the acceptance processing includes accepting the setting for transmitting the notification request, by receiving, via the LAN, the setting request transmitted from the information terminal, and the second sewing machine transmission processing includes transmitting, to the server via the public network, the notification request including the second status information and the identification information included in the setting request received from the information terminal, when the setting for transmitting the notification request is accepted by the acceptance processing, and the sewing status acquired by the acquisition processing satisfies the predetermined condition.

9. The monitoring system according to claim 1, wherein the computer-readable instructions further instruct the first processor to perform a process comprising:
storage processing of storing the identification information in the first memory,
the second sewing machine transmission processing includes
transmitting, to the server via the public network, the second status information, and the identification information stored in the first memory by the storage processing, when the sewing status acquired by the acquisition processing satisfies the predetermined condition, and
the computer-readable instructions further instruct the first processor to perform processes comprising:
specification processing of specifying the information terminal with which a session cannot be established via the LAN at a time of activation, and
deletion processing of deleting, from the first memory, the identification information of the information terminal specified by the specification processing.

10. A sewing machine that performs sewing, the sewing machine communicating, via a LAN, with an information terminal including a display portion, and communicating, via a public network, with a server, the sewing machine comprising:
a processor; and
a memory configured to store computer-readable instructions that, when executed by the processor, instruct the processor to perform processes comprising:
acquisition processing of acquiring, when a sewing status of the sewing machine changes, the sewing status after the change;
first sewing machine reception processing of receiving, when a status request requesting the sewing status is transmitted from the information terminal, the status request via the LAN;
first sewing machine transmission processing of transmitting, to the information terminal via the LAN, first status information that accords with the sewing status acquired by the acquisition processing, when the status request is received by the first sewing machine reception processing; and
second sewing machine transmission processing of transmitting, to the server via the public network, a notification request including second status information that accords with the sewing status, and identification information identifying the information terminal, when the sewing status acquired by the acquisition processing satisfies a predetermined condition, the notification request causing a notification command to be transmitted from the server to the information terminal via the public network, and the notification command instructing a push notification in the information terminal.

11. The sewing machine according to claim 10, wherein the computer-readable instructions instruct the processor to perform a process comprising:
acceptance processing of accepting a setting for transmitting the notification request, and
the second sewing machine transmission processing includes
transmitting the notification request to the server via the public network, when the setting for transmitting the notification request is accepted by the acceptance processing, and the sewing status acquired by the acquisition processing satisfies the predetermined condition, and
not transmitting the notification request to the server, when the setting for transmitting the notification request is not accepted by the acceptance processing.

12. The sewing machine according to claim 11, wherein the acceptance processing includes accepting the predetermined condition, and
the second sewing machine transmission processing includes
transmitting the notification request to the server via the public network, when the sewing status acquired by the acquisition processing satisfies the predetermined condition accepted by the acceptance processing, and
not transmitting the notification request to the server, when the sewing status acquired by the acquisition processing does not satisfy the predetermined condition accepted by the acceptance processing.

13. The sewing machine according to claim 10, wherein the computer-readable instructions instruct the processor to perform a process comprising:
determining that the sewing status acquired by the acquisition processing satisfies the predetermined condition when the state is at least one selected from the group of a state of standing by to replace a sewing thread, a state in which at least selected from the group one of an upper thread and a lower thread used for sewing has snapped, a state in which sewing is complete, and a state in which sewing is stopped due to occurrence of an error.

14. The sewing machine according to claim 11, wherein the acceptance processing includes
accepting a setting for transmitting the notification request, by receiving, from the information terminal via the LAN, a setting request including the identification information, the setting request requesting a setting as to whether the sewing machine transmits the notification request to the server, and
the second sewing machine transmission processing includes
transmitting, to the server via the public network, a notification request including the second status information, and the identification information included in the setting request received from the information terminal, when the setting for transmitting the notification request is accepted by the acceptance processing, and the sewing status acquired by the acquisition processing satisfies the predetermined condition.

15. The sewing machine according to claim 10, wherein the computer-readable instructions further instruct the processor to perform a process comprising:
storage processing of storing the identification information in the memory,
the second sewing machine transmission processing further includes
transmitting, to the server via the public network, the second status information, and the identification information stored in the memory by the storage processing, when the sewing status acquired by the acquisition processing satisfies the predetermined condition, and
the computer-readable instructions further instruct the processor to perform processes comprising:

specification processing of specifying the information terminal with which a session cannot be established via the LAN at a time of activation; and deletion processing of deleting, from the memory, the identification information of the information terminal specified by the specification processing.

16. A monitoring method executed in a monitoring system including a sewing machine that performs sewing, an information terminal that includes a display portion, and a server, the sewing machine communicating with the information terminal via a LAN, the sewing machine communicating with the server via a public network, and the information terminal communicating with the server via the public network, the monitoring method comprising:

an acquisition step of the sewing machine acquiring, when a sewing status of the sewing machine changes, the sewing status after the change;

a first terminal transmission step of the information terminal using an App transmission function to transmit, to the sewing machine via the LAN, a status request requesting the sewing status, the App transmission function being a transmission function of an application executed on an operating system of the information terminal;

a first sewing machine reception step of the sewing machine receiving, via the LAN, the status request transmitted from the information terminal;

a first sewing machine transmission step of the sewing machine transmitting, to the information terminal via the LAN, first status information that accords with the sewing status acquired by the acquisition step, when the status request is received by the first sewing machine reception step;

a first terminal reception step of the information terminal using an App reception function to receive, via the LAN, the first status information transmitted from the sewing machine, the App reception function being a reception function of the application;

a first terminal display step of the information terminal using an App display function to display, on the display portion, the sewing status represented by the received first status information, when the first status information is received by the first terminal reception step, the App display function being a display function of the application;

a second sewing machine transmission step of the sewing machine transmitting, to the server via the public network, a notification request including second status information that accords with the sewing status, and identification information identifying the information terminal, when the sewing status acquired by the acquisition step satisfies a predetermined condition;

a server reception step of the server receiving, via the public network, the notification request transmitted from the sewing machine;

a server transmission step of the server transmitting, via the public network, to the information terminal identified by the identification information included in the received notification request, a notification command instructing a push notification for notifying the sewing status represented by the second status information included in the notification request received by the server reception step;

a second terminal reception step of the information terminal using an OS reception function to receive, via the public network, the notification command transmitted from the server, the OS reception function being a reception function of the operating system; and a second terminal display step of the information terminal using an OS display function to display, on the display portion, the push notification for notifying the sewing status, when the notification command is received by the second terminal reception step, the OS display function being a display function of the operating system.

* * * * *